(12) United States Patent
Cerovcevic et al.

(10) Patent No.: US 12,167,300 B2
(45) Date of Patent: Dec. 10, 2024

(54) SYSTEMS AND METHODS FOR PROVIDING RELIABLE MULTICAST TRANSMISSIONS TO MULTIPLE STREAM RECIPIENTS OVER A WIRELESS NETWORK

(71) Applicant: e Scapes Network LLC, Monroe, MI (US)

(72) Inventors: Dragan Cerovcevic, Kettering, OH (US); Robert A. Oklejas, Monroe, MI (US); Roy Radakovich, Trenton, MI (US); Uros Tomanovic, Belgrade (RS); Dejan Teofilovic, Ann Arbor, MI (US); Dimitrije Dinic, Belgrade (RS)

(73) Assignee: e Scapes Network LLC, Monroe, MI (US)

( * ) Notice: Subject to any disclaimer, the term of this patent is extended or adjusted under 35 U.S.C. 154(b) by 0 days.

(21) Appl. No.: 18/468,057

(22) Filed: Sep. 15, 2023

(65) Prior Publication Data

US 2024/0098458 A1    Mar. 21, 2024

Related U.S. Application Data

(60) Provisional application No. 63/406,936, filed on Sep. 15, 2022.

(51) Int. Cl.
| | | |
|---|---|---|
| *H04W 4/06* | (2009.01) | |
| *H04L 65/75* | (2022.01) | |
| *H04N 21/236* | (2011.01) | |
| *H04N 21/266* | (2011.01) | |
| *H04W 84/12* | (2009.01) | |
| *H04L 12/70* | (2013.01) | |

(52) U.S. Cl.
CPC ............ *H04W 4/06* (2013.01); *H04N 21/236* (2013.01); *H04L 2012/5642* (2013.01); *H04L 65/765* (2022.05); *H04N 21/26616* (2013.01); *H04W 84/12* (2013.01)

(58) Field of Classification Search
CPC .......... H04L 2012/5642; H04L 65/765; H04N 21/236; H04N 21/26616; H04W 4/06; H04W 84/12
See application file for complete search history.

(56) References Cited

U.S. PATENT DOCUMENTS

| | | | |
|---|---|---|---|
| 8,151,315 B2 | 4/2012 | Oklejas | |
| 8,842,595 B2 * | 9/2014 | Seok | .................... H04L 12/1886 |
| | | | 370/312 |
| 8,978,087 B2 | 3/2015 | Oklejas | |

(Continued)

OTHER PUBLICATIONS

305 BROADCAST, "Product Webpage", https://305broadcast.com/collections/visual-radio, 2023, 2 pages.

(Continued)

*Primary Examiner* — Marcus Smith
*Assistant Examiner* — Kai Chang
(74) *Attorney, Agent, or Firm* — Howard & Howard Attorneys PLLC (57) ABSTRACT

A wireless network system for providing reliable transmission over a wireless network includes a multicast stream source including a modifier and a plurality of multicast stream recipients in communication with the multicast stream source with each of the plurality of multicast stream recipients including an outgoing library.

11 Claims, 5 Drawing Sheets

(56) References Cited

U.S. PATENT DOCUMENTS

| | | | |
|---|---|---|---|
| 9,131,079 B2 | 9/2015 | Oklejas | |
| 9,288,136 B2* | 3/2016 | Shepherd | H04L 45/16 |
| 9,420,321 B2 | 8/2016 | Oklejas | |
| 10,135,947 B1* | 11/2018 | Chen | H04L 12/1868 |
| 10,219,035 B2 | 2/2019 | Oklejas | |
| 2007/0233891 A1* | 10/2007 | Luby | H04L 69/14 |
| | | | 709/231 |
| 2007/0258466 A1 | 11/2007 | Kakani | |
| 2008/0002693 A1* | 1/2008 | Moki | H04L 45/00 |
| | | | 370/390 |
| 2009/0103534 A1* | 4/2009 | Malledant | H04L 12/1877 |
| | | | 370/390 |
| 2009/0319845 A1 | 12/2009 | Liu et al. | |
| 2011/0255458 A1 | 10/2011 | Chen et al. | |
| 2011/0255535 A1* | 10/2011 | Tinsman | H04L 47/10 |
| | | | 370/401 |
| 2012/0259994 A1* | 10/2012 | Gillies | H04L 12/189 |
| | | | 709/231 |
| 2015/0229685 A1* | 8/2015 | Brebion | H04L 65/60 |
| | | | 709/202 |
| 2017/0026712 A1 | 1/2017 | Gonder et al. | |
| 2017/0171611 A1* | 6/2017 | Nair | H04N 21/4408 |
| 2017/0366588 A1* | 12/2017 | Appleby | H04L 65/756 |
| 2018/0069908 A1* | 3/2018 | Buchanan | H04L 67/563 |
| 2018/0131742 A1* | 5/2018 | DiMattia | H04L 65/612 |
| 2020/0313915 A1* | 10/2020 | Seth | H04L 12/18 |
| 2022/0052862 A1 | 2/2022 | Agrawal et al. | |

OTHER PUBLICATIONS

Cision US, Inc., "Digital Signage Market to Reach $35.94 Billion by 2026; Increasing Demand for Digital Advertising Solutions to Favor Market Growth: Fortune Business Insights", https://www.prnewswire.com/news-releases/digital-signage-market-to-reach-35-94-billion-by-2026-increasing-demand-for-digital-advertising-solutions-to-favor-market-growth-fortune-business-insights-300981532.html, Jan. 6, 2020, 9 pages.

Dopublicity, "Digital Signage Advertising Network—Rates and Revenue Calculator", https://www.dopublicity.com/Digital-Signage-Advertising-Prices.aspx, 2022, 2 pages.

Shoutcast, "Webpage", https://www.shoutcast.com/monetize, 2023, 5 pages.

International Search Report for Application No. PCT/US2023/032837 dated Dec. 19, 2023, 1 page.

* cited by examiner

SYSTEMS AND METHODS FOR PROVIDING RELIABLE MULTICAST TRANSMISSIONS TO MULTIPLE STREAM RECIPIENTS OVER A WIRELESS NETWORK

CROSS-REFERENCE TO RELATED APPLICATIONS

The present application claims priority to and all the benefits of U.S. Provisional Patent Application No. 63/406,936, filed on Sep. 15, 2022, the entire contents of which are expressly incorporated herein by reference.

FIELD OF THE DISCLOSURE

The subject disclosure relates to a wireless network system providing reliable multicast transmission to multiple stream recipients over a wireless network.

BACKGROUND

The rapid diffusion of wireless local area network access combined with the increasing demand to stream with wireless devices through wireless local area networks is driving the need for transmission reliability. Wireless devices may include, but are not limited to, a station, base station, access point, wireless client device, wireless station, laptop computer, personal computer, handheld mobile device, media player, workstation, television, and so forth. With the increased number of wireless devices, collision with data traffic may occur where there are multiple wireless devices attempting to transmit simultaneously.

In an IEEE 802.11 wireless local area network (WLAN or wireless LAN), the access point of the wireless LAN may support multicast and unicast packet transmission. Unicast transmissions are between a single source and a single receiver and multicast or broadcast transmissions are between a single source and multiple receivers. With unicast transmissions, wireless local area networks implementing IEEE 802.11 technology utilize retransmission and acknowledgement schemes in an attempt to increase traffic reliability. Multicast packet transmission enables multimedia applications to deliver audio/video streams to multiple receiving stations, which belongs to a dedicated Multicast Group. Multicast packets are transmitted to two or more receiving nodes of the wireless LAN. A source node may transmit multicast packets to a multicast-enabled access point, and the access point sends the multicast packets via wireless transmission to receiving nodes. The 802.11 acknowledgment schemes do not provide a reliable mechanism for ensuring that the receiving nodes actually receive the multicast packets. In an attempt to ensure reliability, 802.11 converts the multicast traffic to unicast traffic where multicast packets are distributed as unicast packets, which are still not suitable for streaming.

As the number and type of multicast transmissions continues to increase, the demands placed on wireless systems and wireless devices also increase. Consequently, more reliable techniques designed to manage multicast transmissions over wireless local area networks are desirable.

SUMMARY OF THE DISCLOSURE

A wireless network system providing reliable multicast transmission over a wireless network includes a multicast stream source including a modifier, with the multicast stream source configured to: receive an unmodified multicast stream; modify, with the modifier, the unmodified multicast stream to generate a modified multicast stream including multicast frames having a sequence number; transmit the modified multicast stream; and create an outgoing library by placing multicast frames associated with the modified multicast stream into the outgoing library to provide a history of the transmitted modified multicast stream.

The system also includes a plurality of multicast stream recipients in communication with the multicast stream source, each of the plurality of multicast stream recipients including a recovery library and being configured to: receive the modified multicast stream from the multicast stream source; place the modified multicast stream into the recovery library; process the modified multicast stream to detect any lost multicast frame or frames; and transmit a unicast recovery request to the multicast stream source for each detected lost multicast frame or frames. The multicast stream source is configured to receive the unicast recovery request from the plurality of multicast stream recipients, generate a unicast stream recovery frame by retrieving the detected lost multicast frame or frames from the outgoing library, and transmit the unicast stream recovery frame to the multicast stream recipient which issued the unicast recovery request. The plurality of multicast stream recipients are configured to receive unicast stream recovery frames, extract lost recovery frames and place them into a corresponding empty space ("hole") in the recovery library. The plurality of multicast stream recipients are also configured to generate a recovered modified multicast stream including the recovered lost multicast frame or frames, modify the recovered modified multicast stream to re-create an unmodified multicast stream from the recovered modified multicast stream by removing the sequence numbers, and deliver the unmodified multicast stream to a consumer. The system thus provides reliable transmission over the wireless network.

The disclosure also provides an associated method for providing reliable transmission over a wireless network. The method includes the steps of: providing a multicast stream source and a plurality of multicast stream recipients in communication with the multicast stream source over a wireless network; intercepting, with the multicast stream source, an unmodified multicast stream including multicast frames; modifying, with a multicast stream source modifier, the unmodified multicast stream to generate a modified multicast stream that includes a sequence number; and transmitting the modified multicast stream from the multicast stream source to the plurality of multicast stream recipients. The method further includes the steps of: receiving, with the plurality of multicast stream recipients, the modified multicast stream from the multicast stream source; detecting, with the plurality of multicast stream recipients, any lost multicast frame or frames associated with the modified multicast stream; transmitting, from the plurality of multicast stream recipients, a unicast recovery request to the multicast stream source corresponding to the detected lost multicast frame or frames. The method also includes the steps of: receiving, with the multicast stream source, the unicast recovery request from the plurality of multicast stream recipients; generating, with the multicast stream source, a unicast stream recovery frame by recovering the detected lost multicast frame or frames from the outgoing library; and transmitting, with the multicast stream source, the unicast stream recovery frame to the plurality of multicast recipients. The method also includes the steps of receiving the unicast stream recovery frames, extracting the lost multicast frame or frames, placing the lost multicast frame or frames into a corresponding empty space in the recovery library; modifying, with the plurality of multicast recipients, the recovered modified multicast stream to re-create an unmodified multicast stream from the recovered modified multicast stream by removing the sequence numbers; and delivering, with the plurality of multicast recipients, the unmodified multicast stream to the consumer.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

The present disclosure will now be described with reference to the accompanying drawings wherein the reference numerals appearing in the following written description correspond to like-numbered elements in the several drawings. The system 10 and methods 200, 300 disclosed herein enable data transmission in communication networks and support multimedia applications over wireless local area networks (WLANs). Nodes of a wireless network may be referred as, but is not limited as, a source, a host, a destination, a node, an access point, and a station.

Figure 1:
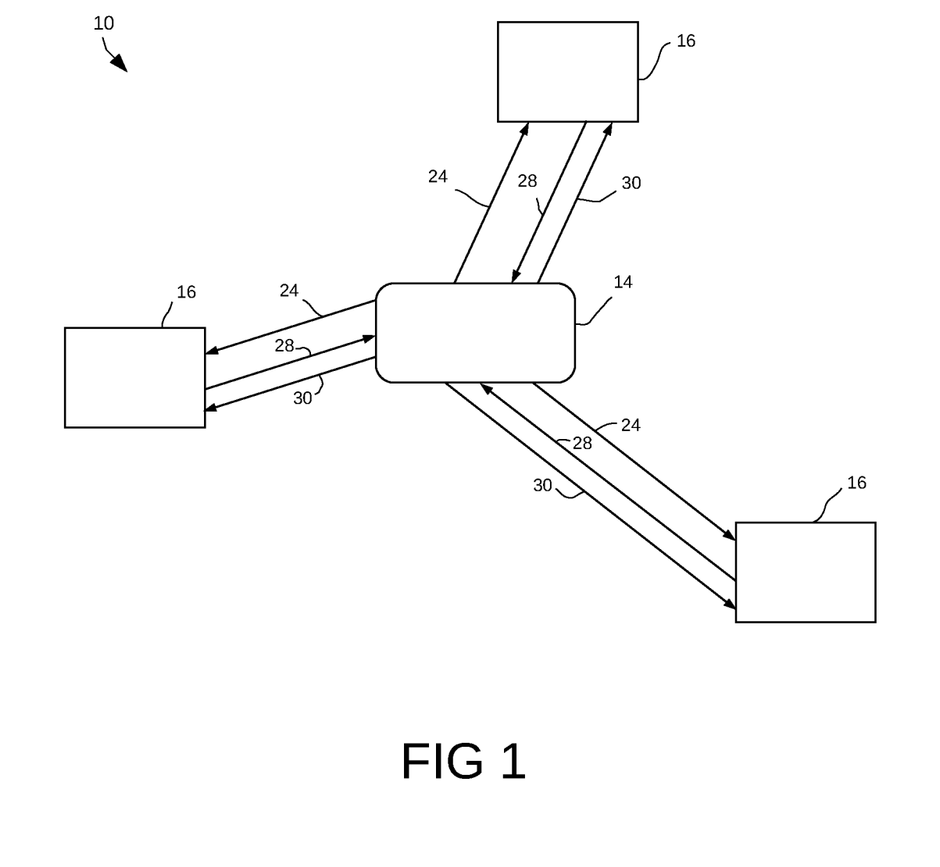
FIG. 1 illustrates a wireless system including a stream source and multiple stream recipients.

Referring to FIG. 1, a wireless network system 10 is shown. The wireless network system 10 provides reliable multicast transmission to multiple stream recipients over a wireless network 12 (see FIG. 2). The configuration of the wireless network system 10 shown in FIG. 1 includes a multicast stream source 14 and at least one multicast stream recipient 16, preferably a plurality of multicast stream recipients 16. Multicast technology makes it possible to send data from a single stream source to many stream recipients through a network. In other words, multicast technology is a means of sending the same data to multiple stream recipients at the same time without the stream source having to generate copies for each stream recipient. To that end, the stream source sends data, in data packet form, to a single address associated to a multicast group to which one or more equipment is interested in being a stream recipient of the data can subscribe. As will be appreciated from the subsequent description below, while the illustrated configurations of the multicast stream source 14 and multicast stream recipients 16 described herein are configured as network nodes for multicast transmission, the wireless network system 10 may also comprise unicast technology and components therewith. It will further be appreciated that the multicast stream source 14 may be configured as a transmitting node and the multicast stream recipients 16 may be configured as receiving nodes. Other configurations are contemplated. It will be appreciated that references to the transmitting and receiving nodes are in no way limited to the function of transmitting or receiving only, respectively, but is at least capable of transmitting or receiving. The multicast stream recipient 16 will be discussed in greater detail below.

Although the disclosure is not limited, the wireless network system 10 may be configured to run a network software stack implementing network protocols of any abstraction layers of a communication model. The wireless network system 10 provides reliable multicast transmissions to multiple stream recipients over the wireless network 12. To ensure the reliable multicast transmissions, the wireless network system 10 delivers reliability layer over the natively unreliable wireless multicast stream by implementing a multicast package loss mitigation strategy, which will be described in greater detail below.

Figure 2:
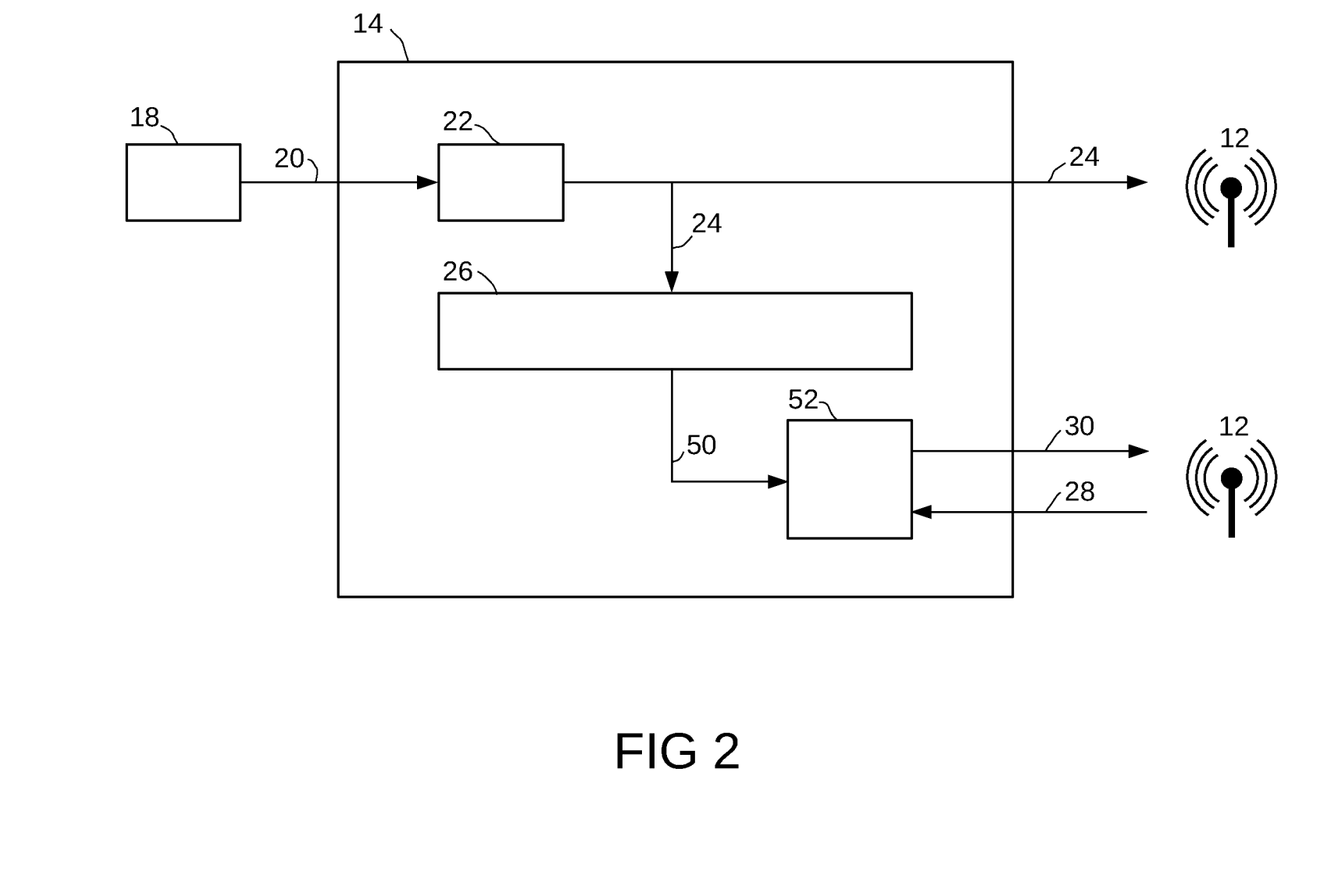
FIG. 2 is a high-level block diagram of the stream source of the wireless system of FIG. 1, shown with the stream source receiving an unmodified multicast stream from a first node and shown with the stream source sending a modified multicast stream to a wireless network.

Referring to FIG. 2, the multicast stream source 14 receives the unmodified multicast stream 20, generated by the multicast stream generator 18. The multicast stream source 14 uses a multicast stream source modifier 22 to modify the unmodified multicast stream 20 and add sequence numbers to each multicast frame, in incremental order. The multicast stream source 14 transmits (i.e., sends) the modified multicast stream 24 to the wireless network 12.

The multicast stream source 14 stores the modified multicast stream 24 into the outgoing library 26. Accordingly, the outgoing library 26 contains a history of the sent modified multicast stream 24. Further, the multicast stream source 14 will be able to re-send modified multicast stream 24 frames to any multicast stream recipient 16 which will send unicast requests for stream recovery 28 on lost frames detection.

The multicast stream source 14 is able to re-send the modified multicast stream 24 to any multicast stream recipient 16 by using a multicast source recovery processor 52. Wireless multicast is natively unreliable, and the multicast stream recipients 16 will generally experience frame loss at times. Once the multicast stream recipient 16 detects a lost frame, it will send unicast requests for stream recovery 28 to the multicast stream source 14. Unicast requests for stream recovery 28 contains the sequence number of the lost modified multicast stream 24 frame, and the unicast address of the multicast stream recipient 16 which issued the request 28.

The multicast source recovery processor 52 receives the unicast requests for stream recovery 28. The processor 52 uses the sequence number and performs a search into the outgoing library 26. The processor 52 searches for the modified multicast stream 24 frame which has the same sequence number. Such a frame is also known as the lost multicast frame 50. Then the processor 52 creates a unicast stream recovery 30 packet, which contains the lost multicast frame 50, and sends it to the multicast stream recipient 16 using the unicast address extracted from the unicast requests for stream recovery 28 packet.

Figure 3:
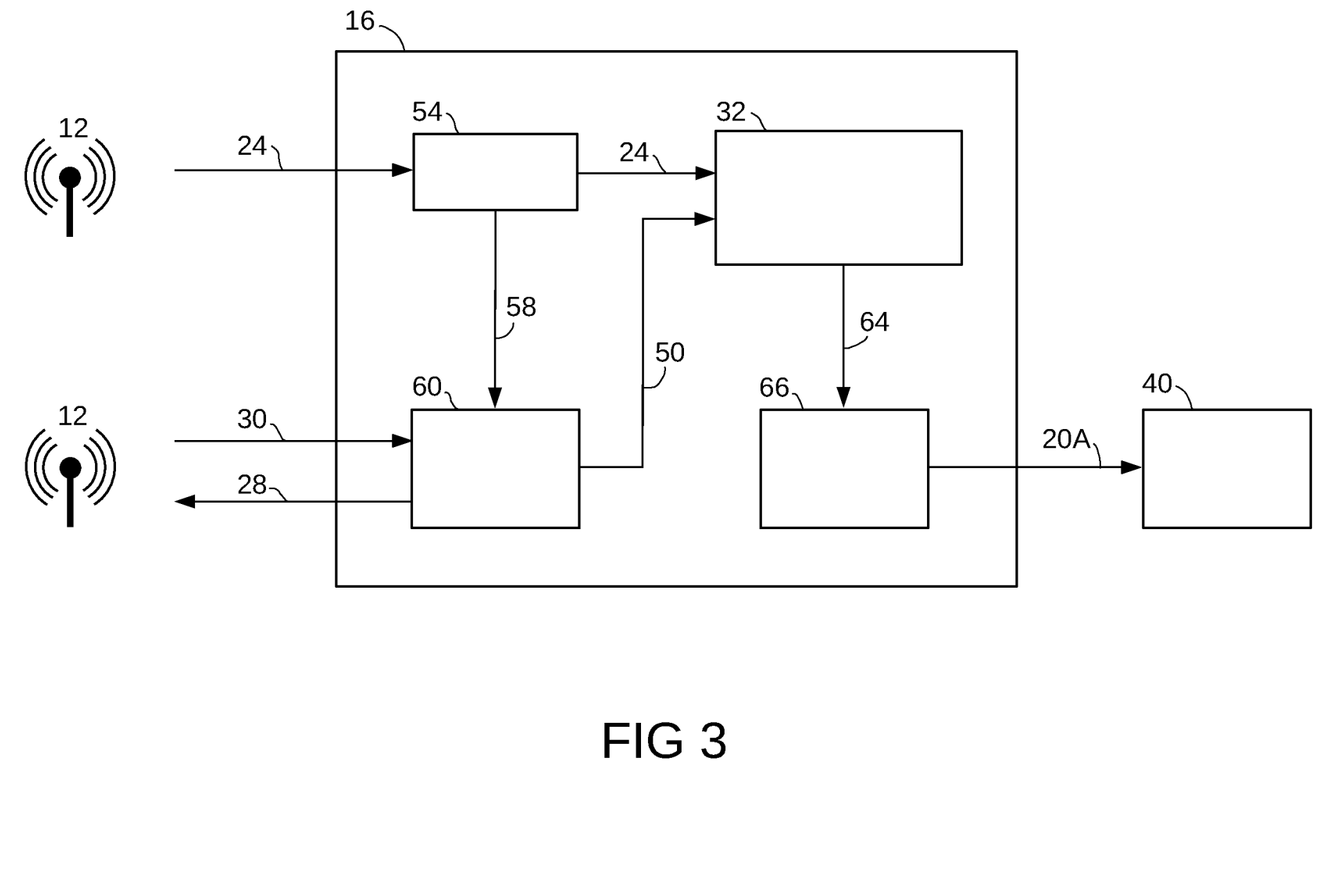
FIG. 3 is a high-level block diagram of one of the multiple stream recipients of FIG. 1, shown with the stream recipient in communication with the wireless network associated with the stream source with the stream recipient receiving the modified multicast stream.

Referring to FIG. 3, the multicast stream recipient 16 receives the modified multicast stream 24 and performs a lost frame detection by using the lost frame detector 54. The lost frame detector 54 performs a sequence number check in the incoming modified multicast stream 24. If no frame loss was detected, the modified multicast stream 24 frames are placed into the recovery library 32. If a lost frame is detected, the lost frame detector 54 will pass a lost sequence number 58 to the multicast recipient recovery processor 60.

The recovery library 32 holds empty places, called "holes", for each detected lost frame (i.e., for each lost frame, there is one "hole").

The multicast recipient recovery processor 60 will, for each lost sequence number 58 it receives, create a unicast request for stream recovery 28. The unicast requests for stream recovery 28 contains the lost sequence number 58 and the unicast address of the multicast stream recipient 16. The unicast requests for stream recovery 28 will be sent to the multicast stream source 14 via the wireless network 12.

The multicast recipient recovery processor 60 expects, for each sent unicast request for stream recovery 28, to receive one unicast stream recovery frame 30 which contains the lost multicast frame 50. The lost multicast frame 50 will then be placed in the recovery library 32, in the corresponding empty place (i.e., the "hole"). Accordingly, the multicast stream recipient 16 uses the multicast recipient recovery processor 60 to recover lost traffic and fill in the "holes" in the recovery library 32.

The recovery library 32 contains M elements at any given moment, including the "holes" described above. Among the M elements are frames received with the modified multicast stream 24 and "holes" which correspond to each lost frame in 24. More precisely, while the plurality of multicast stream recipients 16 are constantly receiving the modified multicast stream 24, the system 10 will experience frame loss, and the multicast stream recipient 16 will take actions to recover the lost frames. While the recovery procedure is in progress, the recovery library 32 contains "holes", awaiting the recovery procedure to fill in the "holes".

Once the multicast stream recipient 16 detects that the recovery library 32 contains N elements (with N<M) without "holes" (i.e., N is the total number of subsequent elements, in the recovery library 32, that don't have "holes"), it uses these N elements to create a recovered modified multicast stream 64 that is passed to the multicast recipient modifier 66. Then, the multicast stream recipient 16 removes these N elements from the recovery library 32. In other words, the multicast stream recipient 16 periodically check contents of the recovery library 32, and in case it finds N subsequent elements without "holes", it passes the N subsequent elements to the multicast recipient modifier 66 and removes the N subsequent elements from the recovery library 32.

The multicast recipient modifier 66 removes sequence numbers from the recovered modified multicast stream 64 (i.e., the group of N subsequent elements represents a portion of recovered modified multicast stream 64 that are ready to be modified, with sequence numbers removed, by the multicast recipient modifier 66) and generates an unmodified multicast stream 20A which is subsequently passed to the consumer 40.

Exemplary methods of the wireless network system 10 providing reliable multicast transmissions to multiple stream recipients over the wireless network 12 are provided. As noted above, the wireless network system 10 implements a multicast frame (or packet) loss mitigation strategy. Specifically, the wireless network system 10 is configured to recover and/or repeat missing or lost multicast traffic via a reliable unicast communication. Said differently, the wireless network system 10 provides such multicast transmission without converting the multicast transmission to a unicast transmission. In this way, the wireless network system 10 achieves reliable multicast transmission by recovering any lost traffic with minimal additional bandwidth.

In general, the method includes the steps of: providing a multicast stream source and a plurality of multicast stream recipients in communication with the multicast stream source over a wireless network; intercepting, with the multicast stream source, an unmodified multicast stream including multicast frames; modifying, with the multicast stream source, the unmodified multicast stream to generate a modified multicast stream that includes a sequence number; and transmitting the modified multicast stream from the multicast stream source to the plurality of multicast stream recipients. The method further includes the steps of: receiving, with the plurality of multicast stream recipients, the modified multicast stream from the multicast stream source; detecting, with the plurality of multicast stream recipients, any lost multicast frame or frames associated with the modified multicast stream; transmitting, from the plurality of multicast stream recipients, a unicast recovery request to the multicast stream source corresponding to the detected lost multicast frame or frames. The method also includes the steps of: receiving, with the multicast stream source, the unicast recovery request from the plurality of multicast stream recipients; generating, with the multicast stream source, a unicast stream recovery frame by recovering the detected lost multicast frame or frames from the outgoing library; and transmitting, with the multicast stream source, the unicast stream recovery frame to the plurality of multicast recipients. The method also includes the steps of receiving the unicast stream recovery frames, extracting the lost multicast frame or frames, placing the lost multicast frame or frames into a corresponding empty space in the recovery library; modifying, with the plurality of multicast recipients, the recovered modified multicast stream to re-create an unmodified multicast stream from the recovered modified multicast stream by removing the sequence numbers; and delivering, with the plurality of multicast recipients, the unmodified multicast stream to the consumer.

Figure 4:
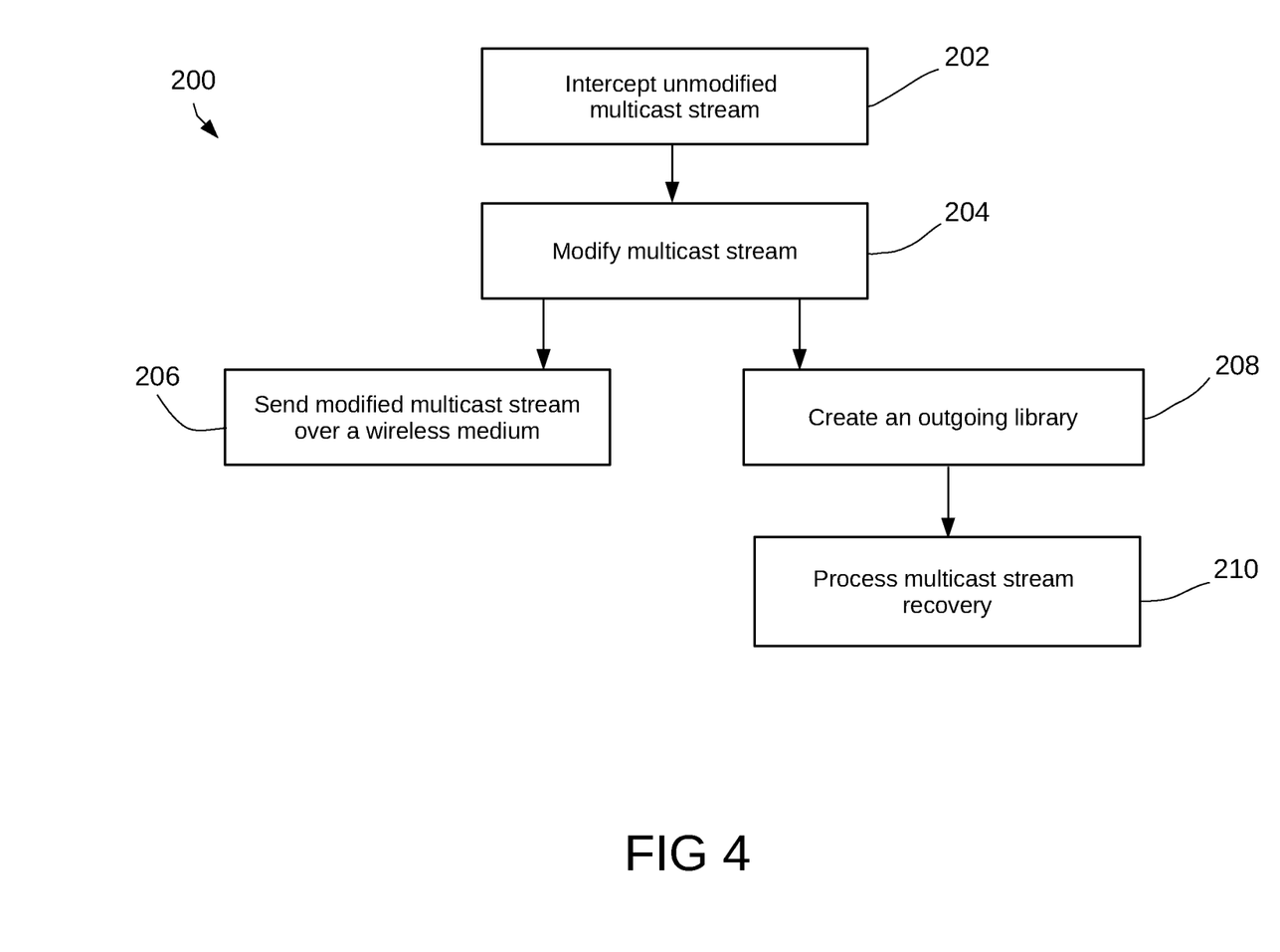
FIG. 4 is an exemplary method for multicast transmission associated with the stream source of FIG. 2.

Referring to FIG. 4, an exemplary method 200 for multicast transmission associated with the multicast stream source 14 of FIGS. 1-3 and elaborating on the more general description above is provided. The wireless network system 10 is configured to implement a multicast package loss mitigation strategy that allows the wireless network system 10 to maintain nearly constant bandwidth requirements while balancing the number of multicast stream recipients 16 in the wireless network 12. Such strategy ensures that the system can recover from expected frame loss associated with the natively unreliable wireless multicast. The method associated with the multicast stream source 14 includes the step of intercepting the unmodified multicast stream 20 (step 202). The multicast stream source 14 modifies the unmodified multicast stream 20 (step 204). To modify the unmodified multicast stream 20, the multicast stream source 14 appends the sequence number SQN to each frame, in incremental order, via the multicast stream source modifier 22. Once through the multicast stream source modifier 22, the unmodified multicast stream 20 becomes a modified multicast stream 24 with the sequence number SQN. In step 206, the multicast stream source 14 transmits (i.e., sends) the modified multicast stream 24 with the sequence number SQN over a wireless medium 12. In step 208, the multicast stream source 14 creates the outgoing library 26 by adding each outgoing frame into the outgoing library 26 to provide a history of the modified multicast stream 24 transmitted from the multicast stream source 14. It will be appreciated that steps 206 and 208 may be deployed either simultaneously or sequentially.

In step 210, the multicast stream source 14 receives and processes unicast requests to recover any missing multicast frames. More specifically, the multicast stream source 14 is configured to receive and process URSR ("unicast requests for stream recovery") packets 28 that include only the sequence number of the lost multicast frame and the unicast address of the recipient 16 which issued the request. Based on the lost sequence number, the multicast stream source 14 is able to retrieve the lost frame by looking into the outgoing library 26. Once the lost frames are identified, the multicast stream source 14 uses the unicast address in the URSR packet(s) 28 to send the lost frame(s) as unicast stream recovery frames 30 to the wireless network 12 and to the recipient node.

Figure 5:
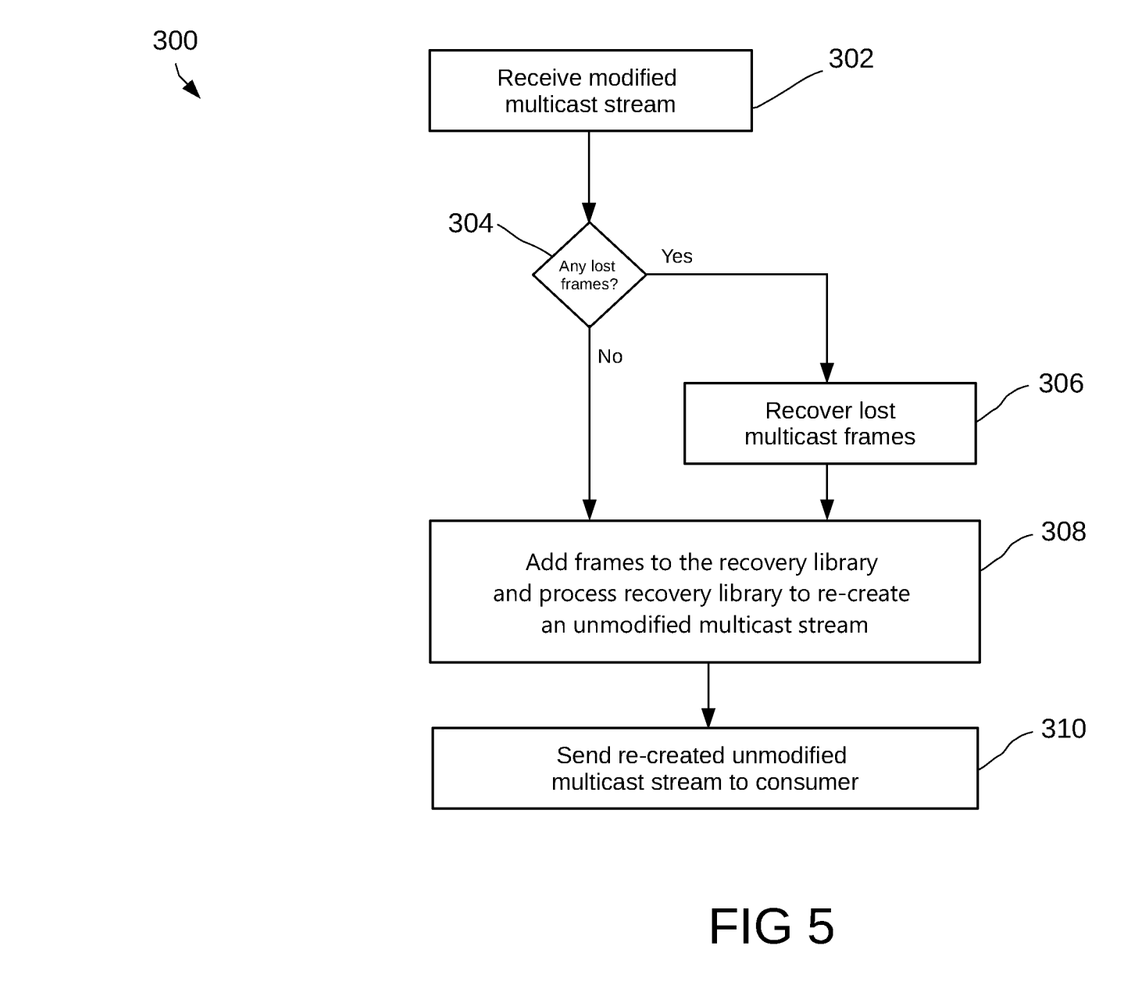
FIG. 5 is an exemplary method for multicast reception associated with the stream recipients of FIG. 3.

Referring to FIG. 5, an exemplary method 300 for multicast transmission associated with the multicast stream recipient 16 is provided that also associated with FIGS. 1-4 as described above. The method associated with the multicast stream recipient 16 includes the step of receiving the modified multicast stream 24 from the multicast stream source 14 (step 302).

At step 304, the multicast stream recipient 16 determines whether there is any loss related to the modified multicast stream 24 received in step 302. More specifically, the multicast stream recipient 16 determines whether there is any lost multicast frames in the received modified multicast stream 24. To determine whether there is any lost multicast frames, the multicast stream recipient 16 detects any lost sequence number in the received modified multicast stream 24.

If there are no lost multicast frames detected in step 304, the method continues to step 308. However, if there are lost multicast frames detected in step 304, the method continues to step 306 prior to step 308.

In step 306, the method continues where the multicast stream recipient 16 recovers the lost multicast frames. In particular, for each detected lost sequence number identified during step 304, the multicast stream recipient 16 leaves an empty place in the recovery library 32 and sends the unicast requests for stream recovery packet 28 that contains the lost sequence number and a unicast address associated with the recipient node. The multicast stream recipient 16 receives unicast stream recovery frames 30 extracts lost multicast frame 50 and place the lost multicast frame 50 in the empty space in the recover library 32. The empty space corresponds to the lost multicast frame and its sequence number. With the empty space filled, the method proceeds to step 308.

In step 308, the recovery library 32 receives the modified multicast stream 24 with no lost frames directly from step 304 or otherwise receives the recovered lost frames 62 from step 306. Once received, the method of step 308 includes wherein the multicast stream recipient 16 processes the recovery library 32 and re-creates an unmodified multicast stream 20A that corresponds to the original unmodified multicast stream 20. In particular, step 308 takes N elements form the recovery library 32, removes sequence numbers and re-creates original unmodified multicast stream. In addition, step 308 also removes N processed elements form the recovery library 32.

In step 310, the multicast stream recipient 16 then delivers the re-created unmodified multicast stream 20A of step 308 directly to the consumer 40 on the same receiver 16 (i.e., delivers from through the same multicast stream recipient 16).

The method 300 of the subject disclosure thus ensures that any missing or lost multicast frames in the modified multicast stream 24 received by the multicast stream recipient 16 are recovered prior to the re-creation of unmodified multicast stream, and unmodified multicast stream 20A being sent to the consumer 40 which in turn provides more reliable multicast transmission of the unmodified multicast stream 20 to the consumer 40.

Through the configurations discussed herein, the system 10 and method enable reliable multicast transmission to multiple stream recipients. Thus, the system 10 and method ensures reliability without multicast conversion to unicast transmissions, which is not suitable for multiple stream recipients.

Several configurations have been discussed in the foregoing description. However, the configurations discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

What is claimed is:

1. A wireless network system providing reliable transmission over a wireless network, the wireless network system comprising:
   a multicast stream source which is not a server and includes a modifier, the multicast stream source configured to:
      receive an unmodified multicast stream;
      modify, with the modifier, the unmodified multicast stream to generate a modified multicast stream including multicast frames having a sequence number;
      transmit the modified multicast stream; and
      create an outgoing library by placing multicast frames associated with the modified multicast stream into the outgoing library to provide a history of the modified multicast stream transmitted;
   a plurality of multicast stream recipients in communication with the multicast stream source, each of the plurality of multicast stream recipients including a recovery library and being configured to:
      receive the modified multicast stream from the multicast stream source;
      place the modified multicast stream into the recovery library;
      process the modified multicast stream to detect any lost multicast frame or frames; and
      transmit a unicast recovery request to the multicast stream source for each detected lost multicast frame or frames;
   wherein the multicast stream source is configured to receive the unicast recovery request from the plurality of multicast stream recipients, generate a unicast stream recovery frame by retrieving the detected lost multicast frame or frames from the outgoing library, transmit the unicast stream recovery frame to the plurality of multicast stream recipients which issued the unicast recovery request,
   wherein the multicast stream source is configured to modify the unmodified multicast stream by appending a sequence number to each multicast frame of the unmodified multicast stream,
   wherein the multicast stream source is configured to append the sequence number to each multicast frame in an incremental order, and
   wherein the plurality of multicast stream recipients are configured to receive unicast stream recovery frames, extract lost multicast frames and place them into a corresponding empty space in the recovery library, generate a recovered modified multicast stream including the recovered lost multicast frame or frames, modify the recovered modified multicast stream to re-create an unmodified multicast stream from the recovered modified multicast stream by removing the sequence numbers, and deliver the unmodified multicast stream to a consumer.

2. The wireless network system of claim 1, wherein the unicast recovery request includes a lost sequence number corresponding to the lost multicast frame associated with the modified multicast stream and a unicast address associated with the multicast stream recipient transmitting the unicast recovery request.

3. The wireless network system of claim 2, wherein, after the multicast stream source is configured to receive and process the unicast recovery request, the multicast stream source is further configured to:
   search the outgoing library for the lost multicast frame associated with the modified multicast stream by searching the corresponding lost sequence number;
   retrieve the lost multicast frame from the outgoing library; and
   transmit the lost multicast frame to the unicast address associated with the multicast stream recipient transmitting the lost multicast frame as the unicast stream recovery frame.

4. The wireless network system of claim 1, wherein when any lost multicast frame is detected, the multicast stream recipient is further configured to:
   provide an empty space in the recovery library;
   transmit the unicast stream recovery request to the multicast stream recipients by unicast transmission;
   receive the unicast stream recovery frame from the multicast stream source; and
   extract the lost modified multicast frame from the unicast stream recovery frame and place the lost multicast frame extracted from the unicast stream recovery frame in the recovery library,
   wherein the empty space is associated with the lost multicast frame and placement of the lost modified multicast frame enables the multicast stream recipient to generate the recovered modified multicast stream.

5. The wireless network system of claim 1, wherein the multicast stream recipient is configured to re-create an unmodified multicast stream from the recovery library by removing the sequence numbers.

6. A method for providing reliable transmission over a wireless network with a wireless network system, the method comprising:
   providing a multicast stream source which is not a server and providing a plurality of multicast stream recipients in communication with the multicast stream source over the wireless network;
   intercepting, with the multicast stream source, an unmodified multicast stream including multicast frames;
   modifying, with a multicast stream source modifier, the unmodified multicast stream to generate a modified multicast stream that includes a sequence number;
   transmitting the modified multicast stream from the multicast stream source to the plurality of multicast stream recipients; receiving, with the plurality of multicast stream recipients, the modified multicast stream from the multicast stream source;
   detecting, with the plurality of multicast stream recipients, any lost multicast frame or frames associated with the modified multicast stream; transmitting, from the plurality of multicast stream recipients, a unicast recovery request to the multicast stream source corresponding to the detected lost multicast frame or frames;
   receiving, with the multicast stream source, the unicast recovery request from the plurality of multicast stream recipients;
   generating, with the multicast stream source, a unicast stream recovery frame by recovering the detected lost multicast frame or frames from the outgoing library;
   transmitting, with the multicast stream source, the unicast stream recovery frame to the plurality of multicast recipients;
   wherein the multicast stream source is configured to modify the unmodified multicast stream by appending a sequence number to each multicast frame of the unmodified multicast stream,
   wherein the multicast stream source is configured to append the sequence number to each multicast frame in an incremental order;
   receiving the unicast stream recovery frames,
   extracting the lost multicast frame or frames,
   placing the lost multicast frame or frames into a corresponding empty space in the recovery library;
   modifying, with the plurality of multicast recipients, the recovered modified multicast stream to re-create an unmodified multicast stream from the recovered modified multicast stream by removing the sequence numbers,
   creating an outgoing library by placing multicast frames associated with the modified multicast stream into the outgoing library to provide a history of the modified multicast stream transmitted from the multicast stream source, and
   delivering, with the plurality of multicast recipients, the unmodified multicast stream to a consumer.

7. The method of claim 6, wherein processing, with the multicast stream source, the unicast recovery request further comprises:
   searching the outgoing library for the lost multicast frame associated with the modified multicast stream by searching the corresponding lost sequence number;
   retrieving the lost multicast frame from the outgoing library; and
   transmitting the lost multicast frame to the unicast address associated with the multicast stream recipient transmitting the lost multicast frame as the unicast stream recovery frame.

8. The method of claim 6, further comprising creating a recovery library associated with each of the plurality of multicast stream recipients being configured to place the modified multicast stream into the recovery library.

9. The method of claim 8, wherein when any lost multicast frame is detected, the method further comprises:
   providing an empty space in the recovery library;
   transmitting the unicast stream recovery request to the multicast stream recipients by unicast transmission;
   receiving the unicast stream recovery frame from the multicast stream source; and
   extracting the lost modified multicast frame from the unicast stream recovery frame and place the lost multicast frame extracted from the unicast stream recovery frame in the recovery library,
   wherein the empty space is associated with the lost multicast frame and placement of the lost modified multicast frame enables the multicast stream recipient to generate the recovered modified multicast stream.

10. The method of claim 6, wherein modifying the recovered modified multicast stream includes removing a sequence number from each multicast frame of the recovered modified multicast stream.

11. The method of claim 6, further comprising re-creating the unmodified multicast stream from the received and recovered modified multicast stream.

* * * * *